United States Patent [19]

Nonnenmann et al.

[11] E Patent Number: Re. 31,889

[45] Reissued Date of Patent: May 21, 1985

[54] HEAT EXCHANGER

[75] Inventors: Manfred Nonnenmann, Schwieberdingen; Helmut Bardong, Stuttgart, both of Fed. Rep. of Germany

[73] Assignee: Süddeutsche Kühlerfabrik Julius Fr. Behr, Stuttgart, Fed. Rep. of Germany

[21] Appl. No.: 502,749

[22] Filed: Jun. 9, 1983

Related U.S. Patent Documents

Reissue of:

[64] Patent No.: 4,305,459
Issued: Dec. 15, 1981
Appl. No.: 114,649
Filed: Jan. 23, 1980

U.S. Applications:

[63] Continuation of Ser. No. 518,147, Oct. 25, 1974, abandoned.

[30] Foreign Application Priority Data

Oct. 25, 1973 [DE] Fed. Rep. of Germany ..... 2353442
May 31, 1974 [DE] Fed. Rep. of Germany ..... 2365476

[51] Int. Cl.[3] ..... F28F 9/16

[52] U.S. Cl. ..... 165/173; 29/157.4; 29/523; 285/222; 285/382.4

[58] Field of Search ..... 29/157.4, 523; 277/11; 165/79, 173, 175, 178; 285/189, 222, 381, 382.4

[56] References Cited

U.S. PATENT DOCUMENTS

| | | | |
|---|---|---|---|
| 513,620 | 1/1894 | Phillips | 165/173 |
| 940,870 | 11/1909 | Gordon | 285/381 X |
| 993,883 | 5/1911 | Schickert | 285/189 X |
| 2,009,863 | 7/1935 | Trane | 29/157.4 |
| 2,184,658 | 12/1939 | Young | 165/79 |
| 2,488,627 | 11/1949 | Hisey | 165/151 |
| 2,573,161 | 10/1951 | Tadewald | 165/153 |
| 2,656,155 | 10/1953 | Garratt | 165/175 X |
| 2,695,446 | 11/1954 | Meyer | 29/157.4 |
| 2,735,698 | 2/1956 | Brimen | 29/157.4 |
| 2,807,445 | 9/1957 | Gardner | 285/189 X |
| 2,886,881 | 5/1959 | Huet | 285/381 |
| 3,027,142 | 3/1962 | Albers et al. | 165/149 |
| 3,283,402 | 11/1966 | Larson | 29/523 |
| 3,557,903 | 1/1971 | Straw | 285/222 |
| 3,583,478 | 6/1971 | Fiemi | 165/178 |
| 3,628,923 | 12/1971 | White | 29/157.4 |
| 3,749,161 | 7/1973 | Hibbeler | 165/178 |
| 3,787,945 | 1/1974 | Pasek et al. | 165/175 X |
| 4,159,741 | 7/1979 | Nonnenmann et al. | 165/173 |
| 4,316,503 | 2/1982 | Kurachi et al. | 165/175 |

FOREIGN PATENT DOCUMENTS

| | | | |
|---|---|---|---|
| 572760 | 11/1958 | Belgium | 29/157.4 |
| 2134028 | 1/1973 | Fed. Rep. of Germany | 165/96 |
| 2813952 | 10/1979 | Fed. Rep. of Germany | 165/178 |
| 258025 | 2/1939 | Italy | 29/157.4 |
| 699032 | 10/1953 | United Kingdom | 165/173 |
| 1353928 | 5/1974 | United Kingdom | 165/175 |

*Primary Examiner*—Sheldon J. Richter
*Attorney, Agent, or Firm*—Schwartz, Jeffery, Schwaab, Mack, Blumenthal & Koch

[57] ABSTRACT

A passage is provided in a heat exchanger water compartment to permit extension of a tube therethrough and at the same time assist in sealing the tube and passage interface. The distance between the intersection of the lower bottom edge of the water compartment bottom part with the inner edge of the passage and the intersection of the horizontal extension of the upper edge of the bottom part in the direction of the passage extension has a positive value.

12 Claims, 3 Drawing Figures

HEAT EXCHANGER

Matter enclosed in heavy brackets [ ] appears in the original patent but forms no part of this reissue specification; matter printed in italics indicates the additions made by reissue.

This is a continuation of application Ser. No. 518,147, filed Oct. 25, 1974, now abandoned.

FIELD OF THE INVENTION

The invention concerns heat exchangers, preferably for motor vehicles, consisting of a tubed finned block, water compartment bottom and water compartment top, especially those in which passages are provided for the tubes in the water compartment bottom.

BACKGROUND OF THE INVENTION

A seal between the bottom part of the water compartment and the tubes in heat exchangers poses particular difficulties, especially in "solderless" heat exchangers, in which the tubes are not soldered to the water compartment while thin bottoms must be used.

It is known to expand the tubes conically after asssembly with the water compartment bottom by an appropriate punch in order thereby to produce a firm seat in the water compartment bottom. It is also known to provide the water compartment bottom in the immediate vicinity of each tube with an annular flange, a "passage," which grips the tube for a certain portion of its length. In known heat exchangers of this type, sealing elements are also provided between the passage and the tube.

SUMMARY OF THE INVENTION

The object of the invention is to provide a connection between the tubes and water compartment bottom in a heat exchanger of the type described hereinabove without using additional sealing elements, and connection being sufficiently stable with respect to compressive and tensile forces, and exhibiting adequate strength to be tight with respect to water and air and mechanical vibrations as occur particularly during the operation of motor vehicles.

This object is accomplished according to the invention by virtue of the fact that the distance between the intersection of the lower bottom surface with the inner surface of the passage and the intersection of the horizontal extension of the upper surface of the bottom in the direction of the passage has a positive value. By virtue of the fact that, as viewed in the direction of the passage, the point of intersection between the transition from the horizontal water compartment bottom to the internal surface of the passage and the external tubed jacket on the one hand and the intersection between the extension of the upper surface of the bottom and the outside of the tube has a definite positive distance, an adequate contact area is provided in the vicinity of the horizontal parts of the bottom.

It is particularly advantageous if the radius of curvature of the transition between the bottom of the water compartment and the outer jacket of the passage is small relative to the radius of curvature of the transition between the upper surface of the bottom and the internal jacket surface of a passage.

According to a further feature of the invention, it is advantageous if the external radius of curvature is small and the internal radius of curvature is large relative to the thickness of the bottom.

According to a further embodiment of the invention, especially in very thin bottoms, the passage is bent at right angles, in such manner that the passage is bent twice at approximately right angles from the bottom part. The two radii of curvature mentioned hereinabove are theoretically zero in this case.

The solution according to the invention also includes sample embodiments in which the passage projects from the bottom of the water compartment into the interior of the water compartment, as well as sample embodiments in which the passages from the bottom of the water compartment project downward.

A particularly advantageous further embodiment is then achieved when the internal length of a passage is approximately equal to three times the distance between the points of intersection of the lower and upper edges of the water compartment bottom with the passage.

A further improvement is then achieved when the internal length of the passage corresponds to approximately three times the thickness of the bottom.

BRIEF DESCRIPTION OF THE DRAWING

Further advantages and features of the invention will be discussed in greater detail with reference to the drawing which shows sample embodiments in schematic form.

DETAILED DESCRIPTION OF THE PREFERRED EMBODIMENTS

Figure 1:
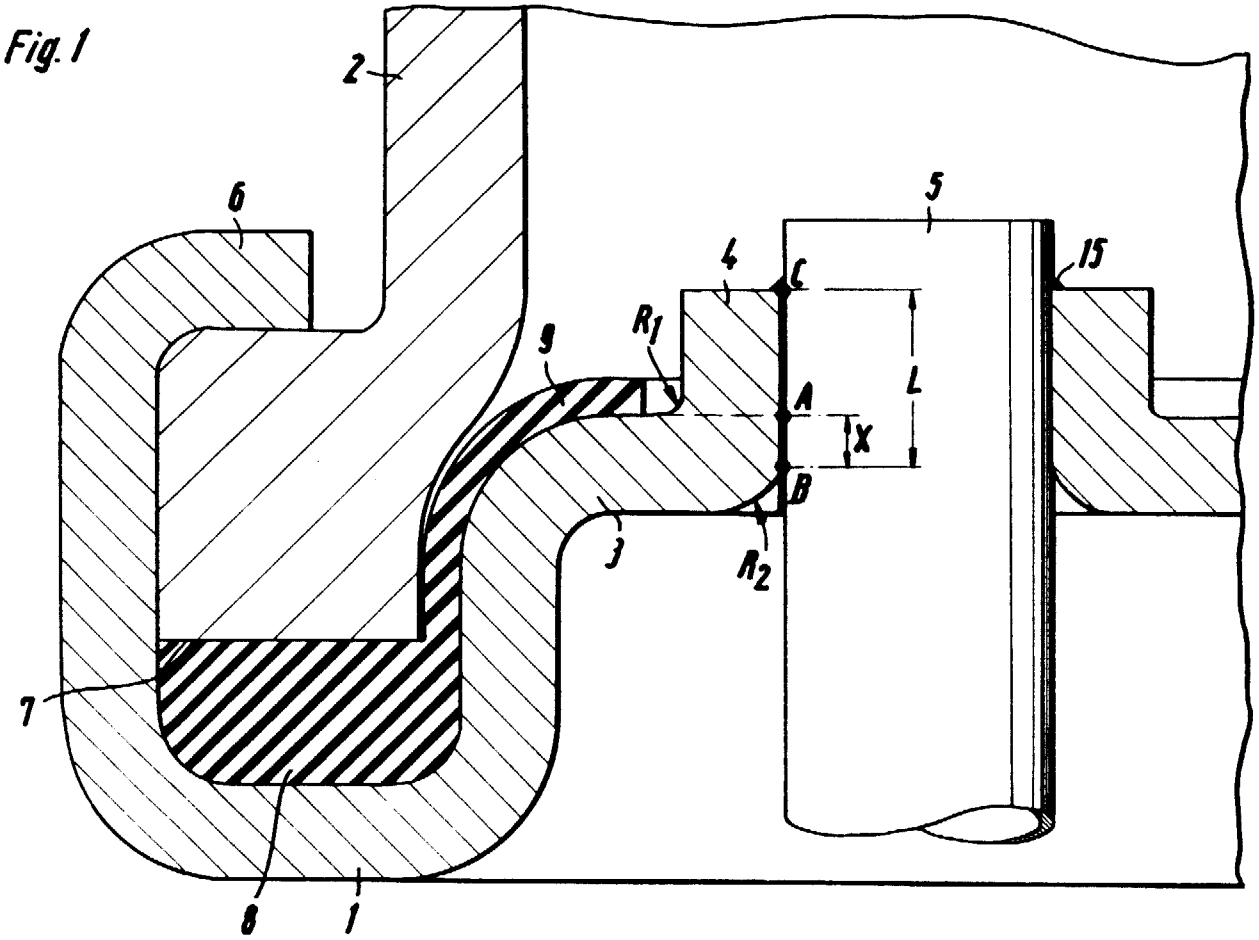
FIG. 1 is a cross-sectional view of a first embodiment of the invention.

In a sample embodiment according to FIG. 1, only a portion of a heat exchanger according to the invention is shown on an enlarged scale. The water compartment is composed of a bottom part 1 and a top part 2. Bottom part 1 is provided with a lower portion to form a groove which accepts a lower edge 7 of the lid, whereby the connection between bottom part 1 and top 2 is achieved by a complete or partial bead 6. A seal 8 is inserted between lower edge 7 of top part 2 and the groove or slot in the lower portion of bottom part 1. Seal 8 is thus formed during construction and completely fills the remaining space. Advantageously seal 8 is provided with lips 9 which partially overlap the flat part of step 3 of bottom part 1.

Bottom part 1 is provided with tubes 5 which are surrounded by passages 4. To provide a reliable sealing of tubes 5 in bottom part 1, according to the invention, the external radius $R_1$ at the transition between the upper surface of the flat part of step 3 and the outer surface of passage 4 is made small relative to the internal radius $R_2$ at the transition from the lower surface of the flat part of step 3 to the internal jacket surface of the passage 4. Thus $R_1$ is small relative to the thickness of the bottom part 1 while $R_2$ is large relative to the thickness of the bottom part 1.

A phantom elongation of the upper surface of the flat part of step 3 intersects the internal jacket surface of a passage 4 or the external jacket surface of a tube 5 at a point A. The lower surface of the flat part of step 3 also intersects the internal wall of passage 4 and the outside circumference of tube 5, but at a point B along the curved portion $R_2$. According to the invention it is important that the distance x between points A and B as viewed in the direction of the extension of passage 4 be positive. In this way, a sufficient compressive force is ensured between tube 5 and passage 4 by the support produced by the bottom part 1 extending out horizontally from passage 4.

The internal length of passage 4 from point B to upper edge C is designated L and bears certain relationships to distance x on the one hand and the thickness of bottom 1 on the other. It has been shown to be particularly advantageous if the length L of passage 4 is approximately equal to three times the distance x between the points of intersection B and A. On the other hand, it is advantageous for the internal length L of passage 4 to be approximately equal to three times the thickness of bottom 1.

The corresponding length of passage 4 is particlarly advantageous with respect to vibration of the heat exchanger since the extending part A-C of passage 4 can respond elastically to the movements of a tube 5.

Figure 2:
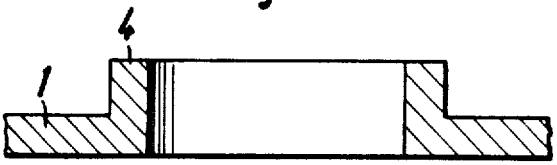
FIG. 2 is a cross-sectional view of a portion of a second embodiment with a passage bent twice at right angles.

With relatively thin walls in bottom part 1 it is possible and advantageous, as shown in FIG. 2, to make the passage or passages 4 in such fashion so that they are bent twice approximately at right angles, i.e. at the lower edge of the flat part of step 3 and at the upper edge of the flat part of step 3, from the bottom part. In this case, the two radii $R_1$ and $R_2$ are theoretically zero.

Figure 3:
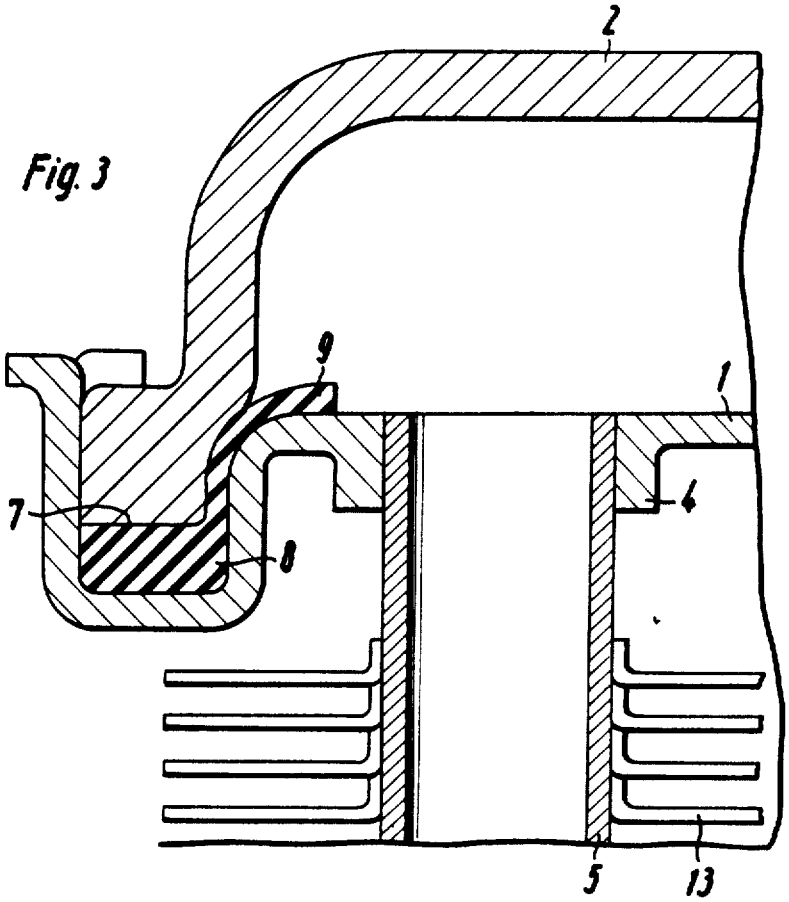
FIG. 3 is a cross-sectional view of a third embodiment with passages projecting downward from the water compartment.

As shown in FIG. 3, passages 4 can also be made such that they project downward out of a water compartment. In FIG. 3, cooling panels or sheets 13 have been shown schematically.

Further improvement of the sealing can also be achieved as shown in FIG. 1, by providing a seal 15 at a contact edge between passage 4 and tube 5, for example with a sealing material commercially available under the name of Locktite.

The invention is not limited to the sample embodiments presented and described above. It can also be applied in the case of any connection between the bottom of a water compartment and the top of a water compartment and any form of the seal between the bottom part and the top part. In particular, the embodiment according to the invention can be used in water compartments made of plastic. The invention also incorporates all modifications that might be made by a person of ordinary mechanical skill in the art as well as partial and subcombinations of the features and methods described and/or shown.

What is claimed:

1. In a solderless heat exchanger including a water compartment, having a substantially planar bottom having upper and lower surfaces, and a top, and a block of finned tubes passing through the water compartment bottom, in which the tubes are seated therein by expansion of the tubes, the improvement by which the interconnections of the tubes with the water compartment bottom are made tight with respect to water and air, without additional sealing elements, wherein the tubes are surrounded by passages comprising a portion of the bottom in which the entire thickness of the bottom is bent to surround said tubes and wherein, for each said tube, the line of intersection of (1) the curved portion of that surface of said water compartment bottom which contacts said tube, with (2) the internal cylindrical portion of said surface which is in contact with said tube lies between planar extensions, at said tube, of said upper and lower surfaces of said water compartment bottom.

2. A heat exchanger in accordance with claim 1, wherein said passages are formed such that they extend in the direction away from the water compartment top.

3. A heat exchanger in accordance with claim 1 wherein said passages are formed such that they extend in the direction toward the water compartment top.

4. A heat exchanger [is] *in* accordance with claim 3, wherein the end of each said tube passing into the water compartment extends beyond the end of the respective passage thereof.

*5. A heat exchanger according to claim 1, further comprising a seal at one contact edge between each of said passages and each of said tubes.*

*6. In a solderless heat exchanger including a water compartment, having a substantially planar bottom having upper and lower surfaces, and a top, and a block of finned tubes passing through the water compartment bottom, in which the tubes are seated therein by expansion of the tubes, the improvement by which the interconnections of the tubes with the water compartment bottom are made sufficiently tight with respect to water and air to form a seal without additional sealing elements in the seat between the tubes and the bottom, wherein the tubes are surrounded by passages comprising a portion of the bottom in which the entire thickness of the bottom is curved to define (a) a curved portion and (b) an internal cylindrical portion which contacts and surrounds each tube of said block of tubes, and wherein, for each tube of said block of tubes, the line of intersection of (1) the curved portion of that surface of said water compartment bottom which contacts said tube with (2) the internal cylindrical portion of that surface of said water compartment bottom which contacts said tube lies between planar extensions, at said tube, of said upper and lower surfaces of said water compartment bottom.*

*7. In a solderless heat exchanger including a water compartment, having a substantially planar bottom having upper and lower surfaces, and a top, and a block of finned tubes passing through the water compartment bottom, in which the tubes are seated therein by expansion of the tubes, the improvement by which the interconnections of the tubes with the water compartment bottom are made sufficiently tight with respect to water and air to form a seal, wherein the tubes are surrounded by passages comprising a portion of the bottom in which the entire thickness of the bottom is curved to define (a) a curved portion and (b) an internal cylindrical portion which contacts and surrounds each tube of said block of tubes, and wherein, for each tube of said block of tubes, the line of intersection of (1)* the curved portion of that surface of said water compartment bottom which contacts said tube with *(2) the internal cylindrical portion of that surface of said water compartment bottom which contacts said tube lies between planar extensions, at said tube, of said upper and lower surfaces of said water compartment bottom.*

*8. A solderless heat exchanger comprising:*

*a header compartment having a substantially planar wall having upper and lower surfaces, wherein at least one passage is formed in said wall comprising a portion of said wall in which the entire thickness of the wall is bent to define a curved portion and an internal cylindrical portion of said wall, said curved portion merging into said internal cylindrical portion along a line of intersection extending about said passage;*

*a finned tube passing through said wall and being seated in said passsage by expansion of said tube such that said tube is surrounded by and contacts said internal cylindrical portion of said wall, and wherein the line of intersection of said curved portion with said internal cylindrical portion occurs at a point B lying between planar extensions, at said tube, of said upper and lower surfaces of said header compartment wall.*

*9. A heat exchanger according to claim 8, wherein said passage has an inner surface which curves to meet one of said upper and lower surfaces, and has an outer surface which curves to meet the other of said upper and lower surfaces, and wherein the radius of curvature of said outer surface curve is less than the thickness of said header compartment wall.*

*10. A heat exchanger according to claim 8, wherein said passage has an inner surface which curves to meet one of the said upper and lower surfaces, and has an outer surface which curves to meet the other of said upper and lower surfaces, and wherein the radius of curvature of said inner surface curve is greater than the radius of curvature of said outer surface curve.*

*11. A heat exchanger according to claim 8, wherein said tube is surrounded by and contacts a portion of the header compartment wall which forms said passage along a distance L between said point B and another point C representing the farthest point of contact, and wherein distance L is approximately equal to three times the distance x which is defined as the distance between said point B and a point A defined by the planar extension, at said tube, of said upper or lower surface which lies between points B and C.*

*12. A heat exchanger according to claim 8, further comprising a seal at one contact edge between said passage and said tube.*

* * * * *